United States Patent
Blakesley et al.

(10) Patent No.: US 6,647,811 B2
(45) Date of Patent: Nov. 18, 2003

(54) SEAT BELT TENSION SENSOR WITH OVERLOAD PROTECTION

(75) Inventors: Patrick B. Blakesley, Goshen, IN (US); Robert R. Rainey, Elkhart, IN (US); Murray Kaijala, Elkhart, IN (US); John T. Lewis, Granger, IN (US); Randall Broome, Goshen, IN (US)

(73) Assignee: CTS Corporation, Elkhart, IN (US)

( * ) Notice: Subject to any disclaimer, the term of this patent is extended or adjusted under 35 U.S.C. 154(b) by 320 days.

(21) Appl. No.: 09/884,615

(22) Filed: Jun. 19, 2001

(65) Prior Publication Data

US 2003/0024326 A1 Feb. 6, 2003

(51) Int. Cl.[7] .................................................. G01L 1/26
(52) U.S. Cl. ........................... 73/862.391; 73/862.392; 73/862.393; 73/862.451
(58) Field of Search ..................... 73/862.391, 862.392, 73/862.451, 862.393

(56) References Cited

U.S. PATENT DOCUMENTS

| | | | | |
|---|---|---|---|---|
| 4,452,469 A | * | 6/1984 | Rogers, Jr. | 280/801.1 |
| 5,181,739 A | | 1/1993 | Bauer | |
| 5,244,231 A | | 9/1993 | Bauer | |
| 5,765,774 A | | 6/1998 | Maekawa | |
| 5,960,523 A | * | 10/1999 | Husby et al. | 24/303 |
| 5,965,827 A | | 10/1999 | Stanley | |
| 5,996,421 A | * | 12/1999 | Husby | 73/862.451 |
| 6,081,759 A | | 6/2000 | Husby | |
| 6,151,540 A | | 11/2000 | Anishetty | |
| 6,161,439 A | | 12/2000 | Stanley | |
| 6,205,868 B1 | | 3/2001 | Miller | |
| 6,209,915 B1 | | 4/2001 | Blakesley | |
| 6,230,088 B1 | * | 5/2001 | Husby | 24/303 |
| 6,264,236 B1 | * | 7/2001 | Aoki | 180/268 |
| 6,301,977 B1 | * | 10/2001 | Stojanovski | 73/862.393 |
| 6,336,371 B1 | * | 1/2002 | O'Boyle | 73/865.9 |
| 6,405,607 B2 | * | 6/2002 | Faigle et al. | 73/862.381 |
| 2001/0054323 A1 | * | 12/2001 | Faigle et al. | 73/862 |

FOREIGN PATENT DOCUMENTS

WO  WO99/12012  * 3/1999  ............. G01L/5/04

* cited by examiner

*Primary Examiner*—Max Noori
*Assistant Examiner*—Lilybett Martir
(74) *Attorney, Agent, or Firm*—Mark P. Bourgeois; Mark W. Borgman; Steven D. Weseman (57) ABSTRACT

A seat belt tension sensor is attached to a seat belt in a vehicle. The seat belt tension sensor includes a housing attached between the vehicle and the seat belt. A limit structure is located in the housing. A sensor is attached to the limit structure for generating an electrical signal in response to the sensor being placed in tension. The electrical signal changes as a function of tension on the seat belt. The limit structure moves between a first position in which the limit structure transfers the seat belt tension to the sensor and a second position in which the limit structure transfers the seat belt tension to the housing.

21 Claims, 8 Drawing Sheets

SEAT BELT TENSION SENSOR WITH OVERLOAD PROTECTION

CROSS REFERENCE TO RELATED AND CO-PENDING APPLICATIONS

This application is related to the following U.S. patent applications:

U.S. patent application filed Jun. 19, 2001 and titled, "Seat Belt Tension Sensor".

U.S. patent application Ser. No. 09/441,350, filed Nov. 15, 1999 and titled, "Automobile Seat Having Seat Supporting Brackets with a Stepped Weight Sensor".

U.S. patent application Ser. No. 09/374,874, filed Aug. 16, 1999 and titled, "Automobile Seat Weight Sensor".

U.S. patent application Ser. No. 09/374,870, filed Aug. 16, 1999 and titled, "Vehicle Occupant Position Detector and Airbag Control System".

U.S. patent application Ser. No. 09/422,382, filed Oct. 21, 1999 and titled, "Vehicle Seat Weight Sensor".

U.S. Pat. No. 6,209,915, issued Apr. 3, 2001 and titled, "Seat Belt Tension Sensor".

The foregoing patents have the same assignee as the instant application and are herein incorporated by reference in their entirety for related and supportive teachings.

BACKGROUND OF THE INVENTION

1. Field of the Invention

This invention relates to an automobile sensor for detecting the magnitude of a tensile force in a seat belt used in a car seat, and in particular to a sensor that can detect the magnitude of tension in a seat belt and provide an electrical signal that is representative of the magnitude of tensile force.

2. Description of the Related Art

Air bags have been heralded for their ability to reduce injuries and save lives. However, since their incorporation into automobiles, a problem has existed with people of smaller size and small children. Air bags are designed to cushion the impact of occupants and thus reduce the injuries suffered. However, the force needed to properly cushion the occupant varies based on the size and position of the person.

For example, a larger person requires the bag to inflate faster and thus with more force. A smaller person may be injured by a bag inflating at this higher inflation force. A smaller person is more likely to be sitting close to the dashboard and would therefore stand a higher chance of being injured by the impact of the inflating bag, as opposed to the passenger hitting the fully inflated bag to absorb the impact of the accident. An average sized person can also be injured by an airbag inflation if they are leaning forward, as for example, if they are adjusting the radio.

Because of the concern over injury to passengers in these situations, the National Highway Transportation Safety Administration (or NHTSA), an administrative agency of the United States, is instituting rules requiring the air bag deployment system to identify the passenger size and position and inflate the air bag accordingly.

One way to accomplish this task is to use a seat belt tension sensor in conjunction with an occupant weight sensor. The weight sensor can provide an indication of the force placed by an occupant on the seat. However, if the seat belt is unduly tightened, it can place an additional downward force on the passenger, creating an erroneous weight reading. Similarly, it is common for infant car seats to be secured tightly to the seat. In this circumstance, it is critical for the system to recognize that the passenger does not warrant inflation of the air bag. By sensing the tension on the seat belt in addition to the weight reading from the seat, the actual weight of the occupant can be determined. This allows for the system to safely deploy the air bag.

SUMMARY OF THE INVENTION

It is a feature of the present invention to provide a seat belt tension sensor for attachment to a seat belt in a vehicle. The seat belt tension sensor includes a housing attached between the vehicle and the seat belt. A limit structure is located in the housing. A sensor is attached to the limit structure for generating an electrical signal in response to the sensor being placed in tension. The electrical signal changes as a function of tension on the seat belt. The limit structure moves between a first position in which the limit structure transfers the seat belt tension to the sensor and a second position in which the limit structure transfers the seat belt tension to the housing.

DETAILED DESCRIPTION OF THE PREFERRED EMBODIMENTS

Figure 1:
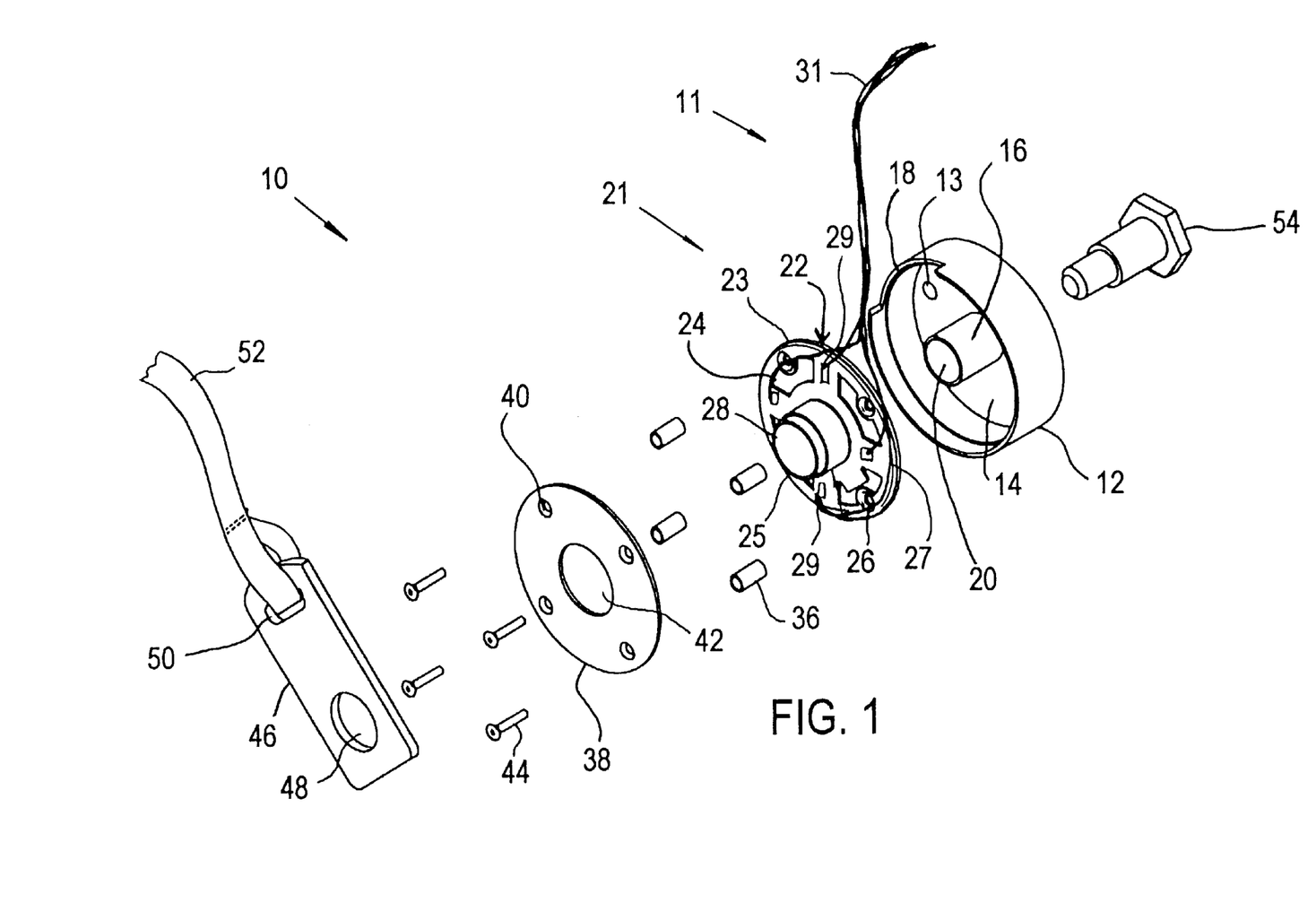
FIG. 1 is a perspective exploded view of the preferred embodiment of a seat belt tension sensor.
Figure 2:
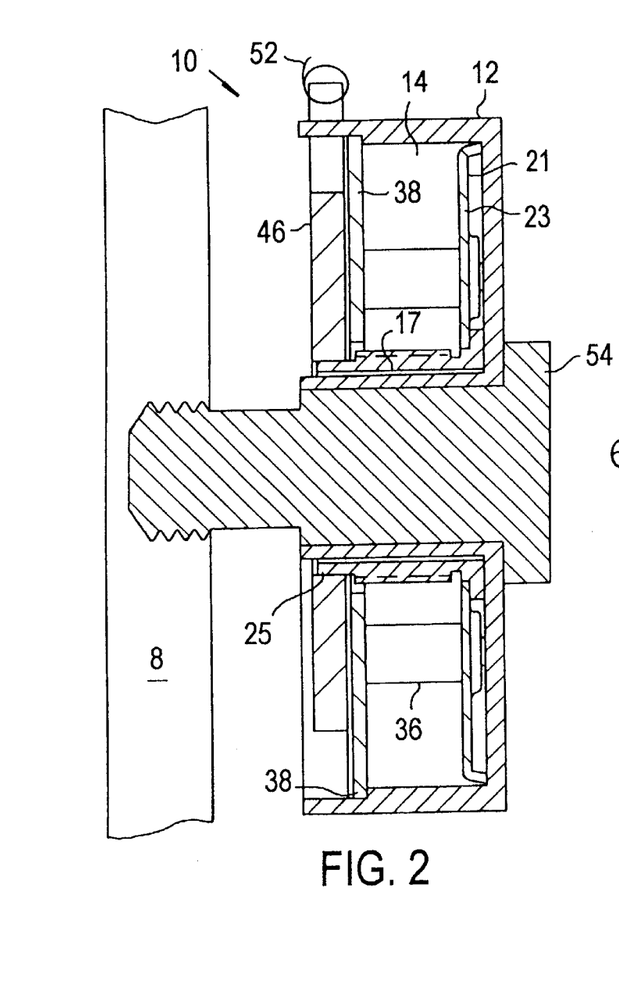
FIG. 2 is a cross-sectional view of FIG. 1 in an assembled state.
Figure 3:
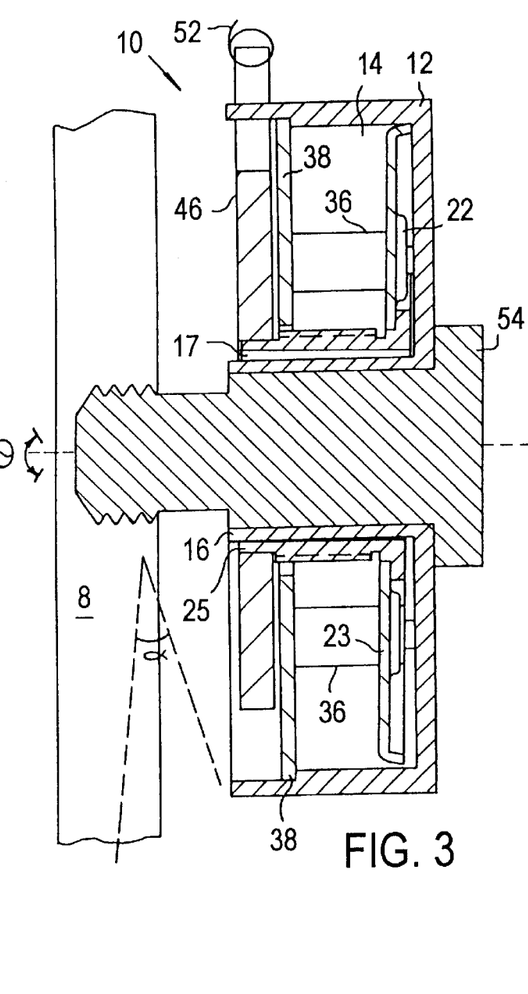
FIG. 3 is another cross-sectional view of FIG. 1 in an assembled state.

The present invention is a seat belt tension sensor. Referring to FIGS. 1, 2 and 3 there is a seat belt tension sensor assembly 10 shown. Assembly 10 has a limit structure 11 and a sensor 21. Limit structure 11 is fastened between seat belt components. For example, structure 11 can be attached to a seat belt plate 46 that is attached to a seat belt webbing 52 and to a vehicle seat or floor 8 by fastener or bolt 54.

Limit structure 11 has a housing 12 with a cavity 14. A cylindrical flange 16 extends into cavity 14 and includes a hollow center portion 20. A recess 18 is provided on one side of housing 12 to allow seat belt plate 46 to extend beyond housing 12. A circular hub 22 has a flat disc shaped portion 23, and a cylindrical rim 25 attached to and extending from the disc shaped portion 23. The rim 25 has an aperture 28 passing therethrough. Several slots 24 are located on disc 23. Several screw holes 26 are also located in disc 23. Disc 23 has several arms 27 that each have a strain gage resistor 29 mounted thereon. Hub 22 goes over flange 16 and creates a gap 17 between the rim and flange as shown in FIG. 2.

A cover 38 goes over housing 12 and is retained to housing 12 by screws 44 or other fasteners that pass through screw holes 26 and into threaded bores 13 in housing 12. Cover 38 has screw holes 40 and a central opening 42. Several springs 36 are located between cover 38 and disc portion 23. Belt plate 46 has a mounting hole 48 that goes over rim 25. Plate 46 has a slot 50 that the seat belt webbing 52 passes through. Webbing 52 would typically be looped through slot 50 and then sewed onto itself to securely fasten the webbing to the plate.

After assembly, threaded fastener or bolt 54 extends through hollow center portion 20, rim aperture 28, central opening 42 and mounting hole 48 and mates with threads in a vehicle floor or seat 8. Fastener 54 is a conventional fastener such as a hex headed bolt, Allen head screw, shoulder screw or rivet.

Sensor 21 includes the hub 22, disc portion 23 and rim 25. Hub 22 is preferably formed from 430 stainless steel. Several strain gage resistors 29 are arranged on arms 27 around rim 25. Details of the construction and operation of resistors 29 are shown in U.S. patent application Ser. No. 09/441,350, filed Nov. 15, 1999 and titled, "Automobile Seat Having Seat Supporting Brackets with a Stepped Weight Sensor".

Resistors 29 would typically be connected in a conventional wheatstone bridge configuration. Resistors 29 are strain sensitive and will change resistance based on the amount of strain in arms 27. A wiring harness 31 would typically connect resistors 29 to an external electrical circuit.

Reffering to FIG. 2, showing a normal load state for the present invention, when an occupant sits in a vehicle seat and buckles a seat belt, the tension placed in the seat belt is transferred from webbing 52 to buckle plate 46 to sensor 21 through rim 25 and disc 23. The force is transferred from disc 23 through springs 36 to cover 38 and housing 12 then to floor 8 through fastener 54. In this state, two of springs 36 are being compressed pressing down on disc 23 while two of springs 36 are in tension. An electrical output signal is generated by the resistors 29 that is proportional to the magnitude of the tension in the seat belt and is transmitted over a wire harness 31 to a conventional air bag controller (not shown). The air bag controller can then use the seat belt tension information to compute a more accurate profile of the seat occupant and use that information to control deployment of the airbag. This is the normal operational state of the seat belt tension sensor in which all of the seat belt tension is carried through the sensor 21.

In a situation where the vehicle is involved in a crash, the seat belt tension sensor operates in a different mode called a high load or crash state as shown in FIG. 3. In the high load state, the limit structure carries the tension placed on the seat belt. The amount of tension in the seat belt in a crash situation is much larger than in normal operation. If the hub 22 was designed to carry all of this tension, it would not flex enough to properly function as a strain gage sensor. Therefore, in a crash situation, the limit structure carries the tension through the much stronger limit structure 11. As the tension in the seat belt increases, the hub 22 rotates or tilts until rim 25 contacts flange 16 providing a positive stop. The seat belt tension is then transferred through buckle plate 46 to rim 25, flange 16, bolt 54 and then to the vehicle floor or seat frame 8. The limit structure 11 is designed so as not to deform under the load placed on it by the seat occupant during a crash situation.

Remarks About the Preferred Embodiment

The seat belt tension sensor has several advantages. It allows accurate sensing of seat belt tension, while at the same time providing the structural strength needed for occupant restraint in a crash situation. The seat belt tension sensor allows an airbag controller to make better decisions as to when and how to deploy and airbag based upon more accurate seat occupant information. In the case of a child's car seat being strapped into a car seat, the seat belt tension sensor in conjunction with a seat weight sensor allows the airbag controller to properly compute that the seat occupant has a low weight and to prevent deployment of the airbag.

The gap between the hub and the housing flange is the travel range of the sensor as it is actuated. This design solves four main problems. 1) Maintaining sensitivity at low loads without damage at higher loads. 2) Maintaining restraint system integrity. 3) Integration into multiple restraint systems. 4) Reading correctly over a wide range of strain angles. A theta angle represents rotation about the axis of the bolt. An alpha angle represents tilt toward and away from the seat.

1. Maintaining Sensitivity at Low Loads Without Damage at Higher Loads

When the gap between the rim and the flange is closed the load applied to the strain sensor elements reaches its limit. After this, the load is transferred to the bolt. Limiting the maximum load applied to the strain sensor is necessary since the working range of the sensor is generally below 100-lbs. but the sensor must withstand large (often greater than 1000-lb.) loads without damage and must not compromise the integrity of the passenger restraint system.

Springs 36 can be omitted if desired. Springs 36 are added to allow larger motions. These springs apply a load, which holds the hub 22 in place until a designed actuation force is reached. Once this force is exceeded the springs allow the hub to move. This both limits the load applied and allows the tolerances between the limit structure 11 and the shoulder bolt 54 to be looser.

2) Maintaining Restraint System Integrity

The present design allows the use of the same or very similar mounting bolts and anchors and mounting technique as do current seatbelt attachment methods. Thus, safety engineers are very familiar with the requirements of the attachment method and installation procedures are changed as little as possible.

3) Integration Into Multiple Restraint Systems

This present invention allows the sensor to be attached at the most common point of a wide variety of belt systems. It is useable even with very short bolt to buckle distances. The only changes required in some installations are a larger mounting hole in the anchor and a longer bolt to allow for the thickness of the device. The shoulder bolt is used as the stop. A tube through which the bolt passes could also be used as a stop. The advantage of this design is that it does not require a shoulder bolt with the correct shoulder length and diameter for the device to operate. A standard bolt may be used. This improves field serviceability.

4) Reading Correctly Over a Wide Range of Theta and Alpha Angles

Theta represents rotation about the axis of the bolt. Alpha represents tilt toward and away from the seat. The attachment to the floor may be fixed or, more likely, the sensor would be free to rotate and tilt plus or minus several degrees. This freedom of movement allows the sensor to respond only to tension on the seatbelt while accommodating user needs. The cross-style sensor design allows the tension load to be applied at a fairly wide range of theta angles with only small changes in sensitivity. This allows the sensor to rotate (theta) normally to accommodate passenger needs. If desired, the sensor can rotate around the bolt axis in order that its sensing elements could remain aligned with the direction of the pull throughout the normal rotation limit of the anchor. This could allow the use of simplified sensor element designs.

The sensor 21 may also be shaped such that only tension is sensed and compression is ignored. This is accomplished by removing one or more arms 27 on the "top" side of the sensor. In the event that the angle of tension application is desired, the sensor can be constructed so that the alpha angle is reported as if it were tension. Or, another separate strain gage or potentiometric sensors or the like can be used to report the angle(s) (alpha and/or theta) at which the tension load is applied.

Alternative Embodiment

Figure 4:
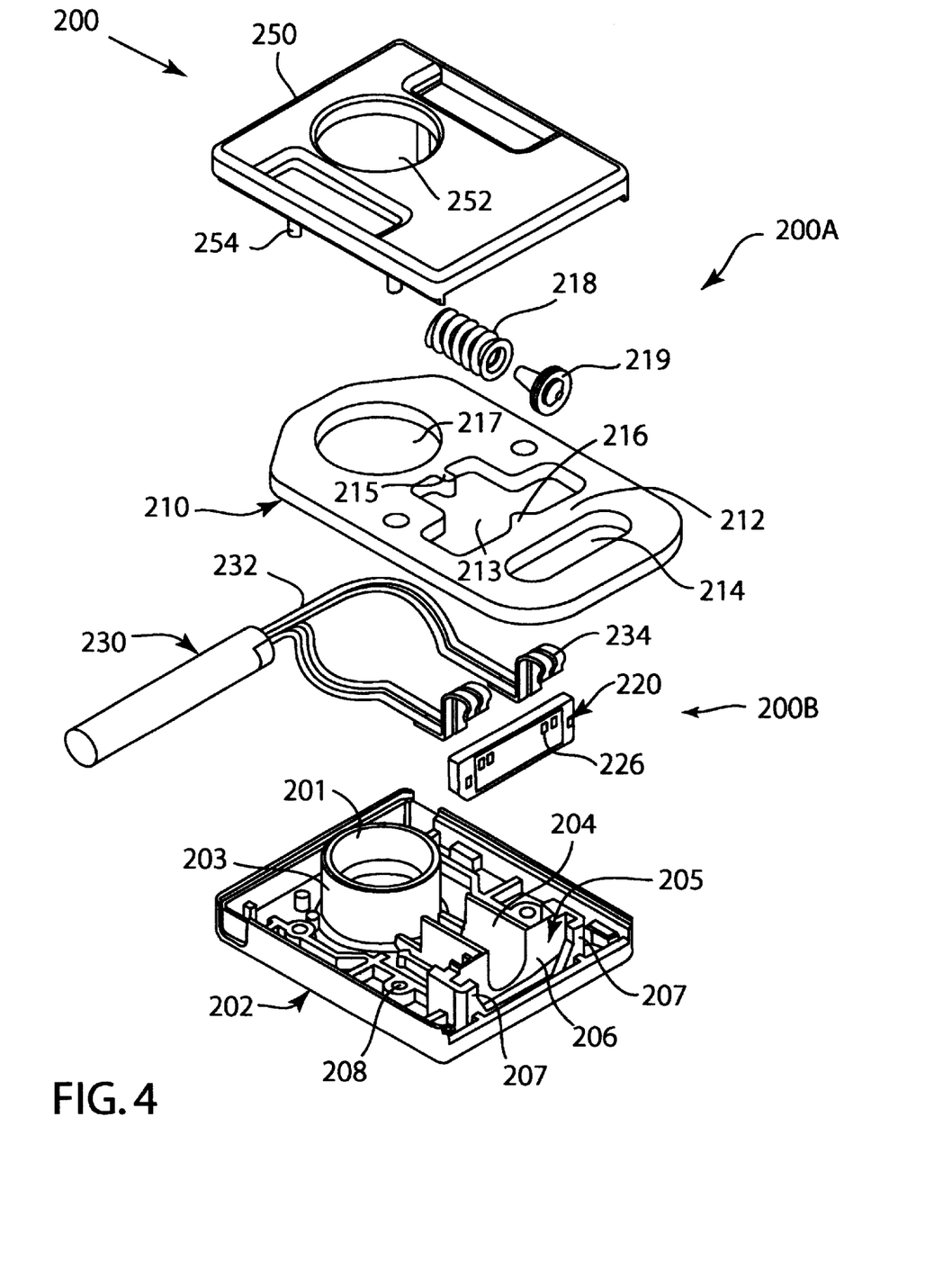
FIG. 4 is a perspective exploded view of an alternative embodiment of a seat belt tension sensor.
Figure 5:
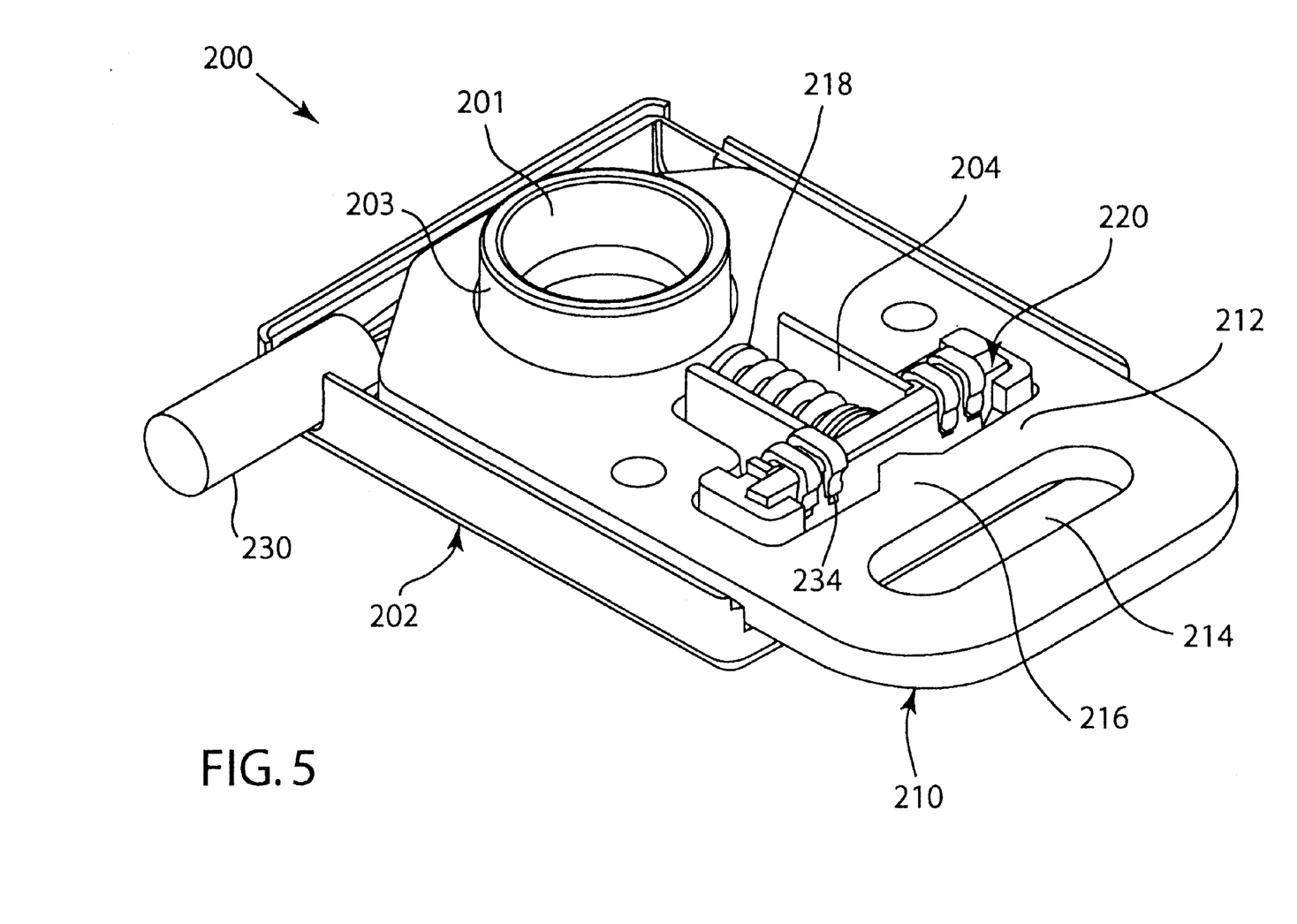
FIG. 5 is a perspective assembled view of FIG. 4 without the cover.
Figure 6:
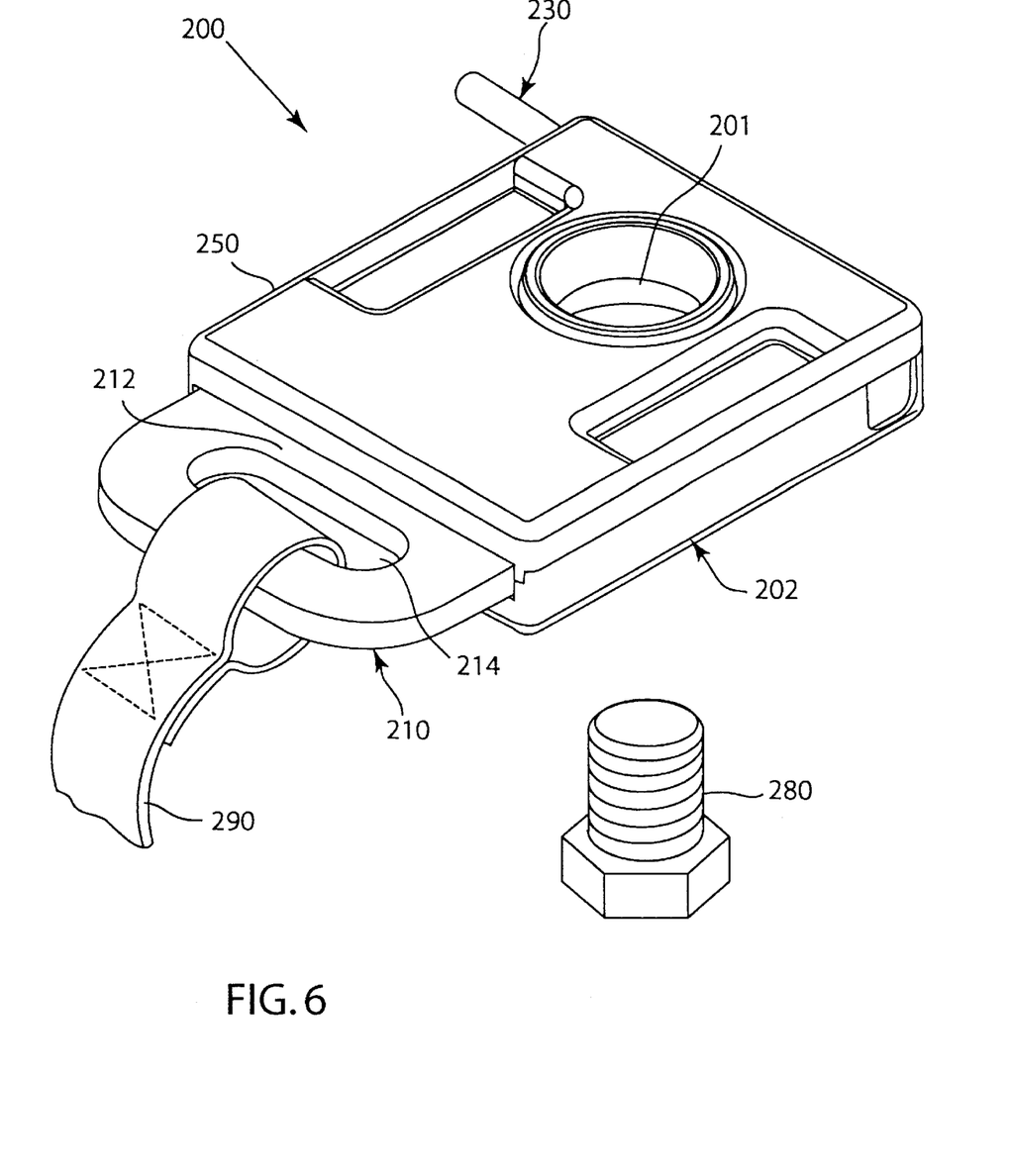
FIG. 6 is a perspective assembled view of FIG. 4 with the cover.

Referring to FIGS. 4–6 there is an alternative embodiment of a seat belt tension sensor assembly 200 shown. Assembly 200 comprises a limit structure 200A and a sensor 200B. Limit structure 200A includes a housing 202, a seat belt plate 210, a cover 250, and a strain sensor or member 220. Housing 202 has an aperture 201, flange 203, spring channel 204, walls 206 and 207 that defined a strain member slot 205 and holes 208. Seat belt plate 210 is loosely fitted within housing 202. Seat belt plate 210 includes an arm 212 extending between a first cutout 213 and a second cutout 214. Seat belt webbing 290 is attached through cutout 214. A pair of projections 215 and 216 extend into first cutout 213. A mounting hole 217 is provided in seat belt plate 210. A spring 218 is mounted in channel 204. One end of spring 218 is mounted over projection 215. Sensor 200B has a strain member 220 that is mounted in slot 205. A plastic support 219 fits into spring 218. Support 219 rests adjacent a surface of strain member 220 and serves to even out the forces from spring 218 on strain member 220.

A wire harness 230 has several wires 232 that end in terminals 234. Terminals 234 clip over connector pads 226 on member 220. A cover 250 has a hole 252 and projections 254. Projections 254 mate with holes 208 to snap fit cover 250 to housing 202. Seat belt tension sensor 200 is attached to vehicle floor (not shown) by a fastener 280 such as a bolt. Fastener 280 goes through holes 201, 217 and 252.

Figure 7:
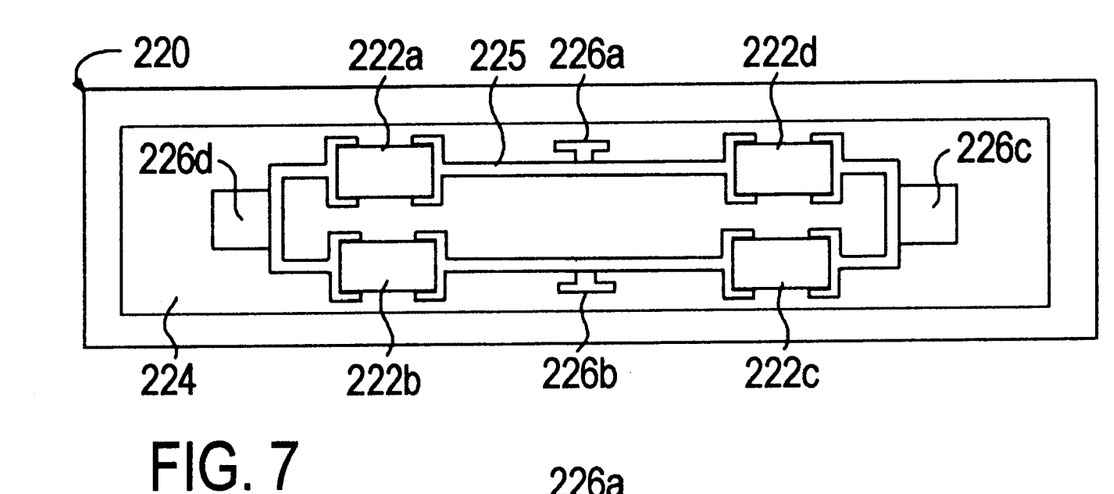
FIG. 7 is a side view of the strain member.
Figure 8:
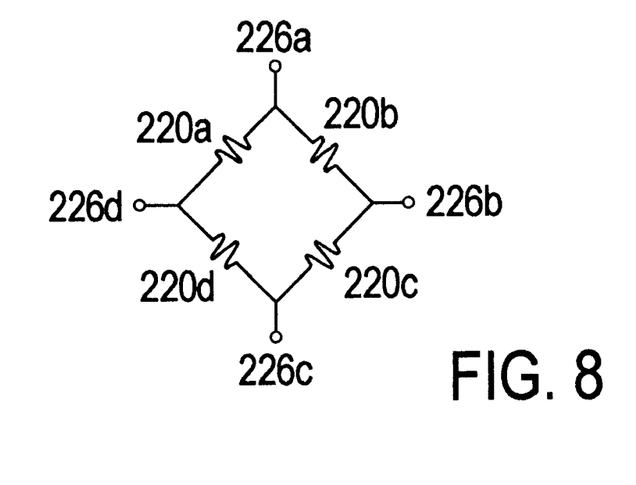
FIG. 8 is a schematic diagram of the wheatstone bridge circuit.

Strain member 220, shown in FIGS. 7 and 8, is formed of a material capable of carrying the tension applied by spring 218 when the seat belt is tightened. Preferably, the strain member 220 is formed of 430 stainless steel. The strain member 220 includes stain sensitive resistors 222$a,b,c,d$ formed thereon. These are formed by first screening a dielectric layer 224 onto the steel. The strain member 220 is then kiln fired at 850° C. Next, electrically conductive traces 225 and connector pads 226$a,b,c,d$ are similarly screened onto the strain member 220. The strain member 220 is again kiln fired at 850° C. The strain sensitive resistors 222$a,b,c,d$ are next screened onto the strain member 220 in positions defined by the electrically conductive traces 225. The strain member 220 is again kiln fired at 850° C. At this point, a final coating of a covercoat or epoxy can be applied to protect the electrical components of strain member 220. This coating is not required, but may be desirable in circumstances where high abrasion or contaminants are expected. It should be noted that the strain sensitive resistors 222$a,b,c,d$ and connector pads 226$a,b,c,d$ together form the Wheatstone bridge circuit of FIG. 8.

Turning FIGS. 4–5, and 9–10, when a tension is applied to seat belt 290, seat belt plate 210 causes spring 218 to apply pressure to the center of the strain member 220. As the tension increases, the strain sensitive resistors 222 will change resistance resulting in an electrical output signal that changes in proportion to the amount of strain in seat belt 290. This electrical signal is provided to an external electrical circuit by wire harness 230.

Figure 9:
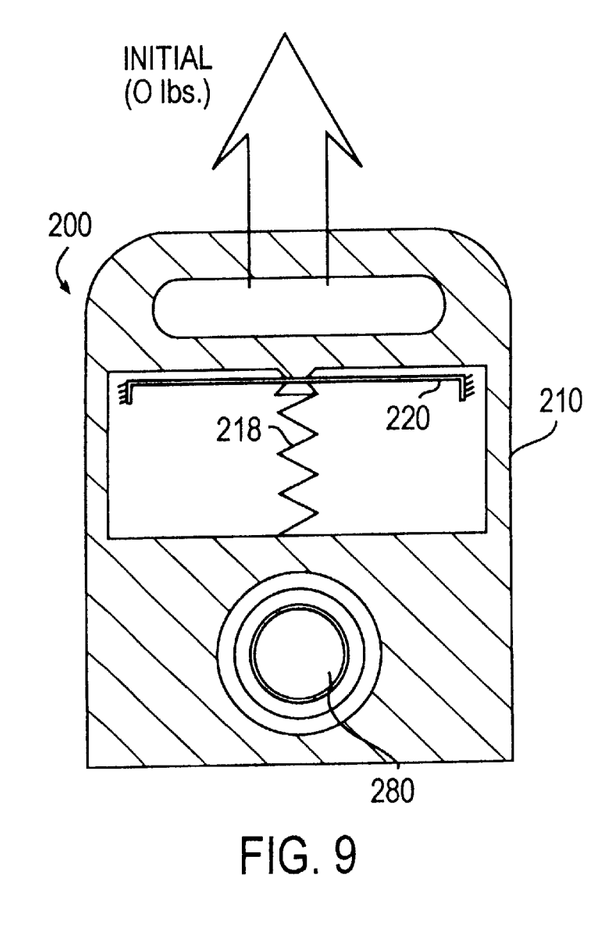
FIG. 9 is a side view of the seat belt tension sensor of FIG. 5 showing a no load state.
Figure 10:
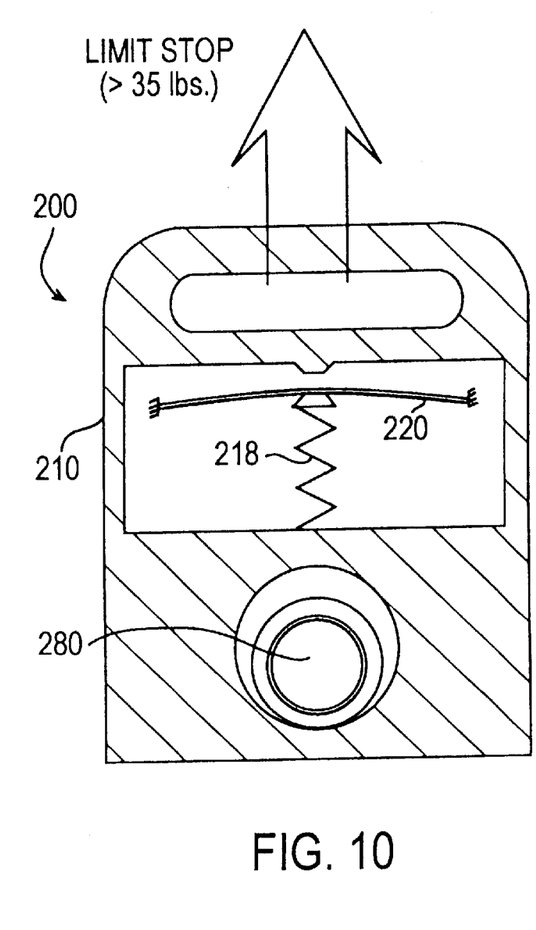
FIG. 10 is a side view of the seat belt tension sensor of FIG. 5 showing a fully loaded state.

In a collision situation, the force applied to the seat belt overcomes the spring resistance and seat belt plate 210 moves to rest against flange 203. Fastener 280 passes through hole 201 and is adjacent to flange 203. The force from the seat belt is transferred to fastener 280 which is attached to a vehicle floor. Thus, the force is transferred form the seat belt to the vehicle floor. In this way, no further tension is applied to the strain member 220 and the strain member 220 is thus protected from excessive forces by limit structure 220A.

Figure 11:
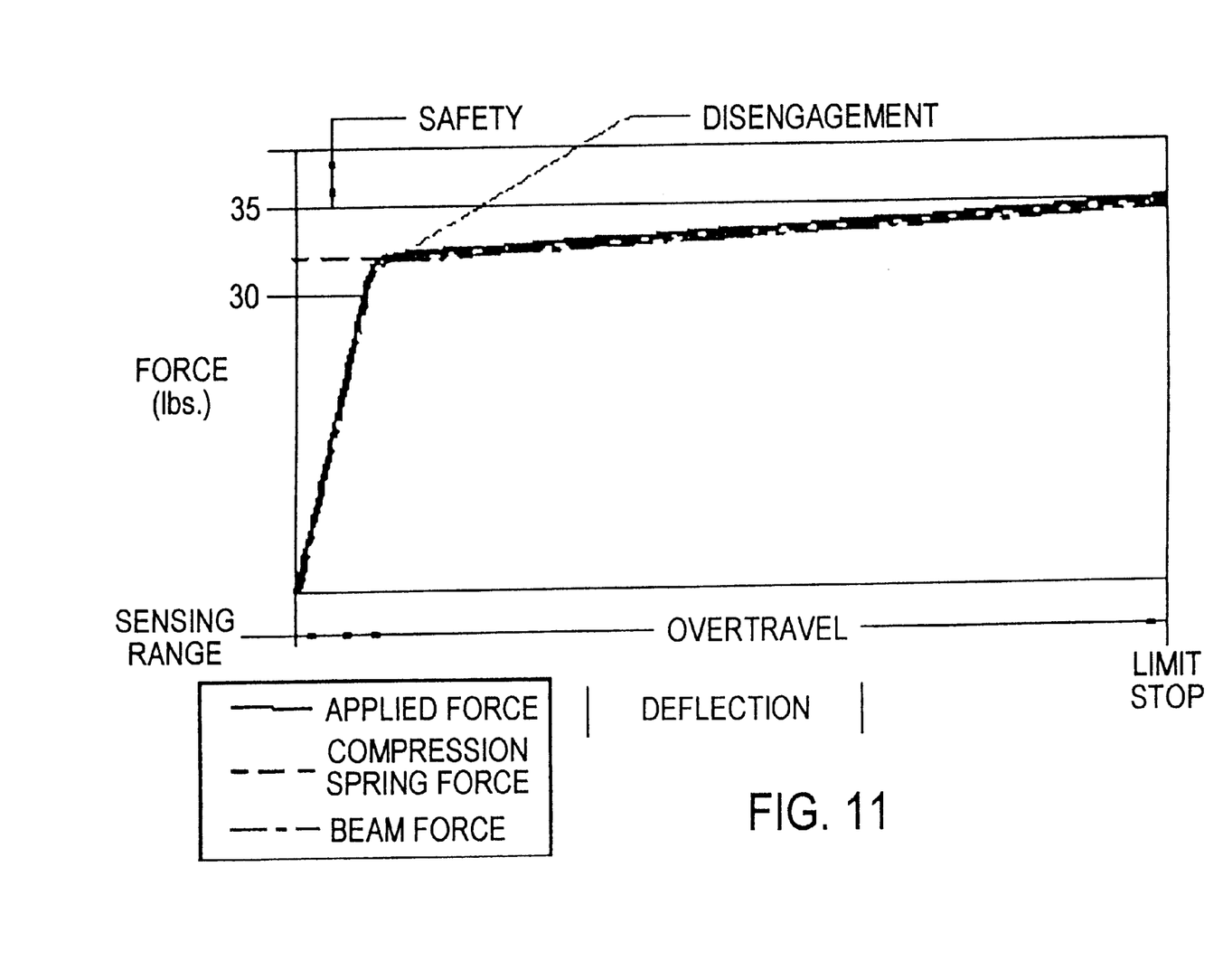
FIG. 11 is a graph of force versus travel for the seat belt tensor sensor of figure It is noted that the drawings of the invention are not to scale.

A graph showing force versus travel for sensor 200 is provided in FIG. 11. Note that the graph varies linearly up to the point of overtravel at which point it flattens indicating and overtravel condition. The output limit is set for the point at which the fastener 280 engages against the seat belt plate 210.

Variations of the Preferred Embodiment

The sensor shown was several strain gage resistors, one skilled in the art will realize that the preferred embodiment would work with other types of sensors. For example, discrete chip resistors could be attached or foil type strain gages could be used. Furthermore, the shape of the sensor could be varied to any configuration that would transfer the weight from the seat belt.

Another variation of the seat belt tension sensor would be to utilize other electrical connections other than a wire harness. For example, a connector or terminals could be added.

Yet, a further variation, would be to place signal conditioning circuitry on hub 22 or strain member 200 to amplify and filter the electrical signal before it is transmitted to the airbag controller.

The seat belt tension sensor shown was mounted between a seat belt and a vehicle member. One skilled in the art will realize that the preferred embodiment could be mounted to various locations on the seat or vehicle interior. For example, the seat belt tension sensor could be attached to the vehicle roof.

The illustrated embodiment showed the use of the seat belt tension sensor in an automobile seat. It is contemplated to utilize the seat belt tension sensor in other occupant sensing applications such as chairs, sofas, scales, beds and mattresses, hospital equipment, cribs, airplane seats, train seats, boat seats, amusement rides, and theater seats, While the invention has been taught with specific reference to these embodiments, someone skilled in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A seat belt tension sensor for measuring the amount of tension in a seat belt in a vehicle, the seat belt tension sensor attached to the vehicle with a fastener, the seat belt tension sensor comprising:

a) a housing having a hole therethrough;

b) a seat belt plate at least partially contained within the housing and surrounding the hole;

c) a strain member mounted to the housing, adjacent the seat belt plate, the strain member having at least one strain sensitive resistor that changes resistance in response to having a force applied thereon, the seat belt plate adapted to apply the force to the strain member; and d) the fastener extending through the hole and the seat belt plate, the seat belt plate adapted to engage the housing to prevent tension larger than a first magnitude from being applied to the strain member.

2. The seat belt tension sensor according to claim 1, wherein the seat belt plate has a first cutout.

3. The seat belt tension sensor according to claim 2, wherein the strain member extends into the first cutout.

4. The seat belt tension sensor according to claim 2, wherein a first projection extends into the cutout.

5. The seat belt tension sensor according to claim 2, wherein the seat belt plate has a second cutout for receiving the seat belt.

6. The seat belt tension sensor according to claim 1, wherein a spring is mounted between the strain member and the seat belt plate.

7. The seat belt tension sensor according to claim 6, wherein the housing has a slot, the strain member mounted in the slot.

8. The seat belt tension sensor according to claim 1, wherein four resistors are mounted to the strain member and interconnected in a wheatstone bridge configuration.

9. The seat belt tension sensor according to claim 1, wherein a wire harness is attached to the strain member and extends from the housing.

10. A seat belt tension sensor adapted to be attached between a seat belt and a vehicle structure comprising:

a) a housing having a cavity;

b) an anchor plate having a first portion located in the cavity and a second portion extending from the housing, the second portion adapted to be connected to the seat belt;

c) a sensor mounted to the housing, adjacent the anchor plate; and d) a spring located between the sensor and the anchor plate, the spring pressing on the sensor as tension is applied to the seat belt, the sensor adapted to generate an electrical signal in response to applied tension.

11. The seat belt tension sensor according to claim 10, wherein the anchor plate and the housing co-operate to limit the maximum tension applied to the sensor.

12. The seat belt tension sensor according to claim 10, wherein the sensor is a strain gage.

13. The seat belt tension sensor according to claim 12, wherein the strain gage is a substrate having at least one resistor mounted thereon.

14. The seat belt tension sensor according to claim 13, wherein four resistors are mounted to the substrate and connected to form a wheatstone bridge.

15. A seat belt tension sensor adapted to be attached between a vehicle structure and a seat belt comprising:

a) a housing;

b) sensor means mounted to the housing, the sensor means generating an electrical signal in response to the seat belt being placed in tension, the electrical signal changing as a function of tension on the seat belt; and c) limit means mounted in the housing, adjacent the sensor, the limit means allowing the sensor means to measure seat belt tension less than a first magnitude and to prevent seat belt tension larger than the first magnitude from being applied to the sensor means, the limit means transferring seat belt tension larger than the magnitude from the seat belt to the vehicle structure.

16. A seat belt tension sensor for measuring the amount of tension in a seat belt in a vehicle, the seat belt tension sensor attached to the vehicle with a fastener, the seat belt tension sensor comprising:

a) a housing having a hole therethrough;

b) a seat belt plate at least partially contained within the housing and surrounding the hole;

c) a flange extending from the housing into the hole such that the seat belt plate surrounds the flange;

d) a strain member mounted to the housing, adjacent the seat belt plate, the strain member having at least one strain sensitive resistor that changes resistance in response to having a force applied thereon, the seat belt plate adapted to apply the force to the strain member; and e) the fastener extending through the hole and the seat belt plate, the seat belt plate adapted to engage the housing to prevent tension larger than a first magnitude from being applied to the strain member.

17. A seat belt tension sensor adapted to be attached between a seat belt and a vehicle structure comprising:

a) a housing having a cavity;

b) an anchor plate having a first portion located in the cavity and a second portion extending from the housing, the second portion adapted to be connected to the seat belt;

c) a sensor mounted to the housing, adjacent the anchor plate;

d) a spring located between the sensor and the anchor plate, the spring pressing on the sensor as tension is applied to the seat belt, the sensor adapted to generate an electrical signal in response to applied tension; and e) the anchor plate having a first aperture and the housing having a flange with a hole extending through the flange, the first aperture surrounding the flange.

18. The seat belt tension sensor according to claim 17, wherein a fastener extends through the hole and the first aperture.

19. The seat belt tension sensor according to claim 18, wherein the anchor plate has a cutout, the sensor extending into the cutout.

20. The seat belt tension sensor according to claim 19, wherein the anchor plate has a projection that extends into the spring.

21. The seat belt tension sensor according to claim 17, wherein the flange engages the anchor plate in order to limit the maximum tension applied to the sensor.

* * * * *